(12) United States Patent
Wu et al.

(10) Patent No.: US 12,530,858 B2
(45) Date of Patent: Jan. 20, 2026

(54) AUTO PROXY MESH GENERATION PIPELINE FOR PLANAR-SHAPE CLOTH

(71) Applicant: Tencent America LLC, Palo Alto, CA (US)

(72) Inventors: Kui Wu, Palo Alto, CA (US); Zherong Pan, Palo Alto, CA (US); Xifeng Gao, Palo Alto, CA (US); Guangyi Cai, Palo Alto, CA (US); Qijia Feng, Palo Alto, CA (US); Lanye Wang, Palo Alto, CA (US)

(73) Assignee: Tencent America LLC, Palo Alto, CA (US)

( * ) Notice: Subject to any disclaimer, the term of this patent is extended or adjusted under 35 U.S.C. 154(b) by 161 days.

(21) Appl. No.: 18/383,790

(22) Filed: Oct. 25, 2023

(65) Prior Publication Data

US 2025/0139920 A1 May 1, 2025

(51) Int. Cl.
*G06T 17/20* (2006.01)
*G06T 7/13* (2017.01)
*G06T 19/20* (2011.01)

(52) U.S. Cl.
CPC ............. *G06T 19/20* (2013.01); *G06T 7/13* (2017.01); *G06T 17/20* (2013.01); *G06T 2210/16* (2013.01); *G06T 2219/2004* (2013.01)

(58) Field of Classification Search
CPC ........... G06T 19/20; G06T 7/13; G06T 17/20; G06T 2210/16; G06T 2219/2004
See application file for complete search history.

(56) References Cited

U.S. PATENT DOCUMENTS

2014/0035901 A1\* 2/2014 Chen ..................... G06T 13/40
345/419
2018/0120478 A1 5/2018 Imhof

OTHER PUBLICATIONS

International Search Report and Written Opinion received for PCT Patent Application No. PCT/US2024/020405, mailed on Jul. 1, 2024, 8 pages.

\* cited by examiner

*Primary Examiner* — Parul H Gupta
(74) *Attorney, Agent, or Firm* — ArentFox Schiff LLP

(57) ABSTRACT

A proxy mesh that includes a plurality of proxy vertices is generated by projecting a visual mesh that includes a plurality of visual vertices onto a fitting plane. The visual mesh is of a character model. Each of the plurality of proxy vertices indicates a respective bone of the character model. A vertex weight associated with each of the plurality of proxy vertices of the proxy mesh is determined. Each of the vertex weights indicates how much the respective proxy vertex impacts a position of a visual vertex of the plurality of visual vertices that is adjacent to the respective proxy vertex. A position of each of the plurality of visual vertices is adjusted based on the determined vertex weights of a subset of the plurality of proxy vertices that are adjacent to the respective visual vertex.

20 Claims, 9 Drawing Sheets

AUTO PROXY MESH GENERATION PIPELINE FOR PLANAR-SHAPE CLOTH

TECHNICAL FIELD

The present disclosure includes aspects related to an automated pipeline designed for generation of proxy meshes tailored for planar-like models, such as planar-like cloth models.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Cloth simulation is vital in games because the cloth simulation can add realism and visual appeal to games. In games, characters can wear clothing, capes, or other fabric items. Cloth simulation allows these items to interact naturally with movements of the character, making characters appear more lifelike and making the game world more dynamic and responsive. While cloth simulation can add realism and immersion to games, the cloth simulation also comes with computational costs. Game developers need to balance visual fidelity and performance to ensure that a game runs smoothly on various hardware configurations.

SUMMARY

Aspects of the disclosure include methods, apparatuses, and non-transitory computer-readable storage mediums for proxy mesh generation. In some examples, an apparatus for proxy mesh generation includes processing circuitry.

According to an aspect of the disclosure, a method of mesh processing is provided. In the method, a proxy mesh that includes a plurality of proxy vertices is generated by projecting a visual mesh that includes a plurality of visual vertices onto a fitting plane. The visual mesh is of a character model. Each of the plurality of proxy vertices indicates a respective bone of the character model. A vertex weight associated with each of the plurality of proxy vertices of the proxy mesh is determined. Each of the vertex weights indicates how much the respective proxy vertex impacts a position of a visual vertex of the plurality of visual vertices that is adjacent to the respective proxy vertex. A position of each of the plurality of visual vertices is adjusted based on the determined vertex weights of a subset of the plurality of proxy vertices that are adjacent to the respective visual vertex.

In an example, a first principal component of the plurality of visual vertices is determined based on a principal component analysis (PCA). The first principal component includes a most variation of the plurality of visual vertices. The fitting plane is determined based on the first principal component in which a normal vector of the fitting plane is determined based on a direction of the first principal component.

In an example, samples are obtained from each of a plurality of faces of the visual mesh based on a uniform sampling. Each of the plurality of faces of the visual mesh is defined by a respective subset of the plurality of visual vertices. The obtained samples from the plurality of faces of the visual mesh are projected onto the fitting plane. A two-dimensional (2D) signed distance field is determined on the fitting plane on which the obtained samples are projected.

In an example, a plurality of 2D isolines is extracted from the 2D signed distance field based on an iso-value through Marching Squares. An outer boundary of the 2D signed distance field is defined by the plurality of 2D isolines.

In an example, a plurality of 2D squares is determined in the 2D signed distance field based on samples in the 2D signed distance field. Each of the plurality of 2D squares includes 4 respective samples. States of the samples of each of the plurality of 2D squares are determined based on the iso-value. The states of the samples of the respective one of the plurality of 2D squares indicate whether the samples are larger than the iso-value. A point is determined between each pair of adjacent samples of the plurality of 2D squares that have different states. Adjacent points of the determined points are connected to form the plurality of 2D isolines.

In an example, a plurality of simplified line segment loops is generated based on the plurality of 2D isolines. The plurality of simplified line segment loops is generated based on a subset of the determined points, where a distance between the plurality of simplified line segment loops and the plurality of 2D isolines is equal to or less than a threshold value.

In an example, a Poisson disk sample set is generated. The Poisson disk sample includes a plurality of samples within a domain defined by the plurality of simplified line segment loops in which a distance between each pair of neighboring samples of the Poisson disk sample set is larger than a threshold distance. A subset of the plurality of samples is removed to generate the plurality of proxy vertices. The subset of the plurality of samples is removed based on a weighted sample elimination in which each of the plurality of samples is assigned with a weight and the subset of the plurality of samples are removed according to the respective weights.

In an example, each of the plurality of samples is assigned with the respective weight. A first sample of the plurality of samples and neighboring samples of the first sample are determined based on a k-dimensional tree structure of the plurality of samples. A heap is built based on the first sample of the plurality of samples and the neighboring samples of the first sample. The heap indicates that the first sample and the neighboring samples of the first sample are organized in a binary tree-based structure based on the weights of the first sample and the neighboring samples of the first sample. One of the neighboring samples of the first sample is removed that corresponds to a largest weight in the heap.

In an example, the weight of each sample of the plurality of samples is associated with distances between the respective sample and respective neighboring samples of the respective sample.

In an example, the proxy mesh is generated based on a plurality of Delaunay triangles that are formed based on the plurality of proxy vertices, where a circumcircle of each of the plurality of Delaunay triangles being an empty circle.

In an example, the position of a i-th visual vertex of the plurality of visual vertices is adjusted based on four proxy vertices of the plurality of proxy vertices adjacent to the i-th visual vertex according to $v'_i = (\Sigma_{j=1}^{4} w_{i,j} T_j) v_i$. $v_i$ is an initial position of the i-th visual vertex. $v'_i$ is the adjusted position of the i-th visual vertex. $T_j$ is a spatial transformation matrix associated with a j-th proxy vertex of the four proxy vertices. $w_{i,j}$ is the vertex weight that is associated with the j-th proxy vertex and indicates how much the j-th proxy vertex impacts the initial position of the i-th visual vertex.

In an example, the vertex weight $w_{i,j}$ associated with the j-th proxy vertex is determined as:

$$w_{i,j} = \begin{cases} 1, & \text{if } d_j/d_{max} < \epsilon_d, \\ e^{-\sigma^2\left(\frac{d_j/d_{max}}{1-\epsilon_d}\right)^2}, & \text{otherwise.} \end{cases}$$

$d_j$ indicates a distance between the j-th proxy vertex and the i-th visual vertex. $d_{max}$=max $(d_1, d_2, d_3, d_4)$. $\epsilon_d$ is a predefined value.

According to another aspect of the disclosure, an apparatus is provided. The apparatus includes processing circuitry. The processing circuitry can be configured to perform any one or a combination of the methods for proxy mesh generation.

Aspects of the disclosure also provide a non-transitory computer-readable medium storing instructions which when executed by at least one processor cause the at least one processor to perform any one or a combination of the methods for proxy mesh generation.

BRIEF DESCRIPTION OF THE DRAWINGS

Further features, the nature, and various advantages of the disclosed subject matter will be more apparent from the following detailed description and the accompanying drawings in which.

DETAILED DESCRIPTION OF EMBODIMENTS

Figure 1:
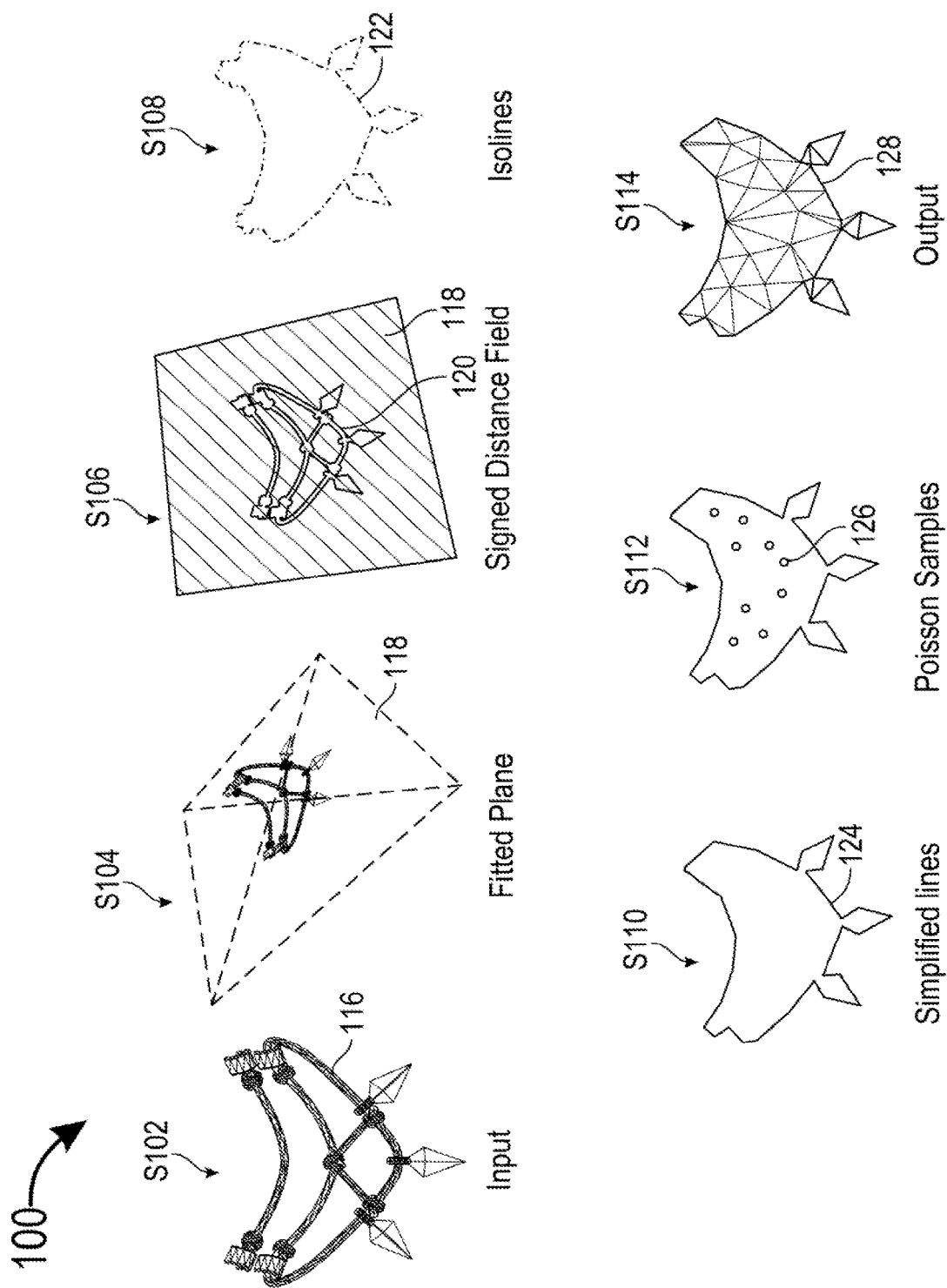
FIG. 1 is a schematic illustration of an exemplary pipeline to generate a proxy mesh in accordance with some embodiments.

A related technique used in cloth simulation for games and real-time applications can be a proxy mesh technique, which uses a simplified version of cloth geometry, known as proxy mesh, for physics calculations rather than simulating a high-resolution, detailed cloth geometry, known as visual mesh, during runtime to achieve real-time cloth animation. A physics engine can calculate how a proxy mesh should respond to forces such as gravity, wind, and collisions with a character or an environment. After the physics simulation, deformation information, such as vertex positions and normals, from the proxy mesh can be transferred to corresponding vertices of the visual mesh. The transformation process can ensure that a visual appearance of the visual mesh matches behavior of the proxy mesh. The visual mesh can then be rendered to create a final visual representation of the cloth to make the cloth look realistic.

The proxy mesh technique can effectively balance visual fidelity and performance in various scenarios. However, creating a suitable proxy mesh for a high-resolution cloth model (or a high-resolution visual mesh), can present many challenges. The challenges can make the proxy mesh technique a labor-intensive and demanding task. To elaborate, an input visual mesh can often contain intricate folds, wrinkles, disconnected components, layered structures, and non-manifold surfaces. In a stark contrast, a resulting proxy mesh may strike a delicate balance, such as maintaining a limited number of vertices while preserving essential characteristics of an overall shape and a dynamic behavior of the cloth. Furthermore, since the proxy mesh can play a critical role in the simulation, vertices of the proxy mesh may be uniformly distributed, may possess high triangle quality, and may be characterized by consistent sizes and angles.

One of the most challenging aspects can be assignment of vertex weights for the proxy mesh to facilitate skin deformation. The assignment of vertex weights (or skinning weights) may require a unique blend of technical expertise, artistic judgment, and an in-depth understanding of how characters move and deform. Artists can be tasked with meticulously adjusting vertex weights, repeatedly testing animations, and making refinements until they achieve a desired level of mesh quality and deformation fidelity. Consequently, crafting a high-quality proxy mesh with skinning weights for a cloth model can be a time-consuming endeavor, often spanning several days, and heavily reliant on an iterative fine-tuning process conducted by skilled artists.

A challenge of generating a coarse approximation from a finely detailed mesh has been a subject of intensive research for several decades. One classical way has involved the selective elimination of elements, including vertices and edges, based on specific conditions or a minimization of certain metrics, such as Quadric Error Metrics (QEM). Over time, additional criteria have been integrated into an elimination process to cater for diverse applications, such as visibility and appearance-preserving. Diverging from a practice of a local metric-based mesh simplification, a mesh simplification can be treated as a global optimization problem. Accordingly, an input mesh can be segmented and further fitted with a set of planes. Global techniques for superior robustness, such as instant meshes, were also studied. The global techniques can optimize directional and positional fields. Although the methods described above have been widely used in a game production to produce a medium-level low-poly mesh, a vertex number of a proxy mesh can typically be under 200, which can pose an extreme challenge to traditional mesh reduction techniques.

Integrating voxelization with remeshing techniques represents a promising avenue for mesh simplification. Nevertheless, this approach may require that an input mesh clearly defines interior and exterior spaces. In an application of the approach for low-poly mesh generation, a watertight mesh can be generated. The generated watertight mesh can be applied for various applications. However, the generated watertight mesh may not be suitable as a proxy mesh for cloth simulation purposes. Several low-poly meshing techniques have also been provided. However, none of the low-poly meshing techniques can produce a simulation-ready mesh that has consistent face sizes and angles.

Physics-based cloth simulation has been a popular topic in the graphics community for decades. An implicit Euler integration has been used to simulate cloth robustly with large time steps while introducing excessive numerical damping. In a related example, the implicit Euler integration can be treated as an energy minimization problem for a mass-spring cloth. Based on a similar idea, Projective Dynamics were proposed to add supports for various hyperelastic materials with a global and/or local solver and later were extended with frictional contacts and Differentiability. Position-Based Dynamics (PBD) can iteratively project each constraint in a non-linear Gauss-Seidel-like fashion, leading to highly parallelizable computation on GPUs. To accelerate cloth simulation, lots of endeavors were tested on GPU, such as Chebyshev acceleration, parallel randomized Gauss-Seidel geometric multigrid scheme, and Galerkin multigrid scheme. To solve a contact between a cloth and an underlying skeleton, penalty methods were applied to add repulsive forces or formulate the contact as a sparse linear complementarity problem. Recently, a smooth dissipative potential was defined for friction using barrier methods to guarantee interpenetration-free states, which can further be accelerated on a GPU. While a GPU-based cloth simulation has made significant strides in terms of speed, enabling real-time simulation of hundreds of thousands of faces, the GPU-based cloth simulation may still be not able to meet demands of video games, which only have a few milliseconds budget for simulation.

Skinning deformation can be a crucial technique in character animation for video games and 3D animation, which can deform a 3D visual mesh in response to movement of an underlying skeleton to balance fidelity and performance. In an example, each vertex of a 3D visual mesh can be associated with one or more bones from the skeleton. The associations between the vertices of the visual mesh and the bones can be defined by vertex weights, which can indicate influence of each bone on deformation of a visual vertex. Although an artist typically can assign vertex weights manually, an automatic weighting processing have been studied through geometric, data-driven, and physics-based methods. Besides a human skin, a skinning technique has also been applied to use bones or a low-resolution mesh to drive cloth with details using data-driven methods. Recently, NeuroSkinning used a large garment dataset meticulously hand-painted by artists for training and utilizes graph convolution techniques to predict vertex weights. Meanwhile, RigNet has introduced a neural rigging solution capable of jointly predicting both a skeletal structure and corresponding skin weights. Geometric methods can primarily rely on geometric attributes like geodesic distance and Laplacian energy to determine vertex weights. On the other hand, physics-based methods can demand a simulation-ready cloth model as a prerequisite. These approaches may excel at handling a simple model but may fall short when confronted with complex intricacies of highly adorned garments, such as medallions. In scenarios where a physics-based approach is unfeasible and assembling a comprehensive dataset through manual artist labeling is a time-intensive endeavor spanning thousands of hours, both traditional and learning-based data-driven methods may encounter insurmountable obstacles due to scarcity of training data.

The disclosure provides a pipeline for automatic generation of proxy meshes tailored for gaming models, such as planar-like cloth model. The process (or pipeline) can begin with fitting a plane to an input visual mesh, followed by projecting the visual mesh onto the fitted plane. Subsequently, a remeshing operation can be performed, ensuring that a resulting proxy mesh can exhibit optimal vertex and triangle quality conducive to simulation. After each visual vertex is bound to neighboring proxy vertices, such as four nearest proxy vertices, a function to generate a skinning weight associated with a visual vertex can be provided. The function can take distances between a visual vertex and neighboring proxy vertices as inputs and output the skinning weights. The disclosed pipeline can ensure a seamless match between the visual mesh and the proxy mesh throughout runtime simulations. Various cloth models used in a game were further tested. The evaluation demonstrates that the automatic pipeline can provide remarkable effectiveness and efficiency to generate a proxy mesh and underscore significant advancements in the field of games.

In the disclosure, a mesh $M \triangleq (V, E)$ can include a set of vertices V in a three-dimensional space, such as $V \subset R^3$. The set of vertices can be connected into a graph via edges E representing a triangulation. In an aspect, an input visual mesh $M_{visual}$ can have multiple components, layers, and wrinkle details. To generate a proxy mesh $M_{proxy}$ with skinning weights (or vertex weightings), a pipeline of the disclosure can include two steps: proxy mesh generation and proxy vertices weighting.

An exemplary pipeline (100) of automatic proxy mesh generation can be shown in FIG. 1 which can include steps as follows:

As shown in FIG. 1, at step (S102), an input visual mesh (116) can be provided. The visual mesh can indicate a piece of cloth, an accessory or a portion thereof, or a like. In an example of FIG. 1, the input visual mesh can indicate a necklace model.

At step (S104), visual vertices $V_{visual}$ from the visual mesh $M_{visual}$ (116) can be fitted to a plane. In an example, Principal Component Analysis (PCA) can be applied to determine a best-fitting plane P (118) by finding principal components of points (or vertices $V_{visual}$) in which a first principal component of the points can correspond to a normal vector of the plane P (118). In an example, a normal vector of the plan (or fitting plane) P (118) can be determined as a direction of the first principal component.

PCA can be a statistical procedure that uses an orthogonal transformation. The orthogonal transform can convert a set of correlated variables to a set of uncorrelated variables. A main goal of PCA is to reduce dimensionality of a dataset (e.g., the visual vertices $V_{visual}$) while preserving most important patterns or relationships between the variables without any prior knowledge of the variables. PCA can identify a set of orthogonal axes, called principal components, that captures a maximum variance in the dataset. The principal components can be linear combinations of the original variables in the dataset and can be ordered in a decreasing order of importance. A total variance captured by all the principal components can be equal to a total variance in the original dataset. In an example, the first principal component can capture a most variation in the dataset, and a second principal component can capture a maximum variance that is orthogonal to the first principal component.

At step (106), uniform sampling can be performed on faces $F_{visual}$ from $M_{visual}$ (116) to obtain a plurality of samples (or visual vertices) s. According to the uniform sampling, samples can be obtained from each face of $F_{visual}$. The plurality of obtained samples s can be a subset of samples (or visual vertices) S of the faces $F_{visual}$, which can be denoted as $s \in S$. Each of the faces $F_{visual}$ can be determined based on a respective subset of the plurality of visual vertices of $M_{visual}$ (116), such as three visual vertices. The plurality of obtained samples s can further be projected on the fitting plane P (118) and denoted as projected samples $s \in S$. If the faces F visual are projected on the fitting plane P (118), the samples of the faces $F_{visual}$ can be denoted as $S_\perp$. Accordingly, $s_\perp \in S_\perp$. Further, based on the projected samples $s_\perp$ on the fitting plane P (118), a scalar field, such as a 2D signed distance field (120), on P (118) can be determined. The signed distance field (120) can indicate a function which takes a position of a point as an input, and outputs an orthogonal distance of the position of the point to a boundary of a dataset (e.g., the projected samples $s_\perp$) in a metric space (e.g., the fitting plane (118)). In an example, points inside the boundary can have a negative distance and points outside the boundary can have a positive distance. Based on the 2D signed distance field (120), an outline of the visual mesh (116) can be obtained.

At step (108), 2D isolines (122) can be extracted from the 2D signed distance field (120) on the fitting plane P (118) using suitable extraction algorithms, such as using marching squares. An exemplary 2D isoline extraction can be shown in FIG. 2. Note that the isolines (122) can be extracted based on an iso-value which can be a user-defined value. In an example, the user-defined value ø can be larger than zero. Consequently, small gaps between disconnected components can be filled by an appropriate ¢. Additionally, holes within other isolines can be removed to over-simplify the extracted geometry.

Figure 2:
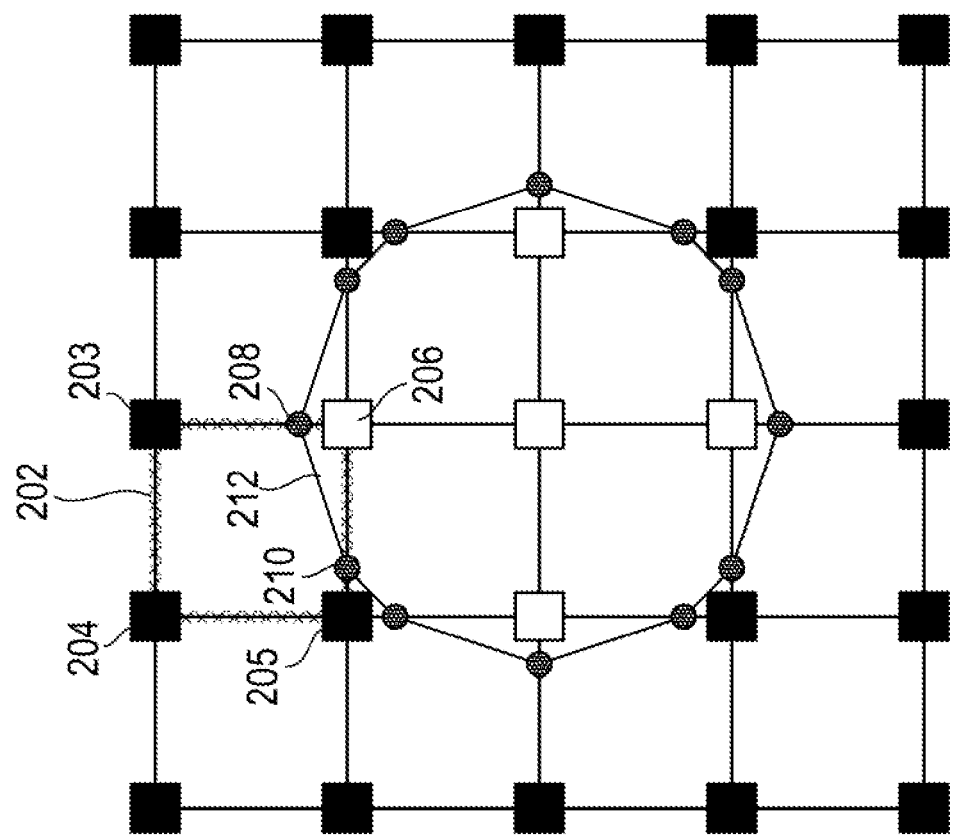
FIG. 2 is a schematic illustration of Marching Squares in accordance with some embodiments.

As shown in FIG. 2, a plurality of 2D squares (e.g., square (202)) in the 2D signed distance field (120) can be formed based on samples in the 2D signed distance field (120). Each of the plurality of 2D squares can include four respective samples. For example, the square (202) can include samples (203)-(206). States of the samples of each of the plurality of 2D squares can be determined based on an iso-value. Each of the states can indicate whether a value (e.g., a coordinate value) of the respective sample is larger than the iso-value. For example, the samples (203)-(205) can have a first state that indicates the values of the samples (203)-(205) are smaller than the iso-value, and the sample (206) can have a second state that indicate the sample (206) is larger than the iso-value. A point (or isopoint) can be determined between each pair of adjacent samples of the plurality of 2D squares that have different states. For example, a point (208) can be interpolated between the samples (203) and (206), and a point (210) can be interpolated between the samples (205) and (206). Adjacent points (e.g., (208) and (210)) of determined points can be connected to form a plurality of 2D isolines (e.g., isoline (212)).

At step (S110), the isolines (122) can be simplified on the 2D plane P (118) through a simplification algorithm, such as Ramer-Douglas-Peucker algorithm. A constant ϵ can be applied to control a maximum distance between the input isolines (122) and output simplified line segment loops (124). After simplification, remaining points in the simplified line segment loops can be denoted as $P_{line}$.

Figure 3:
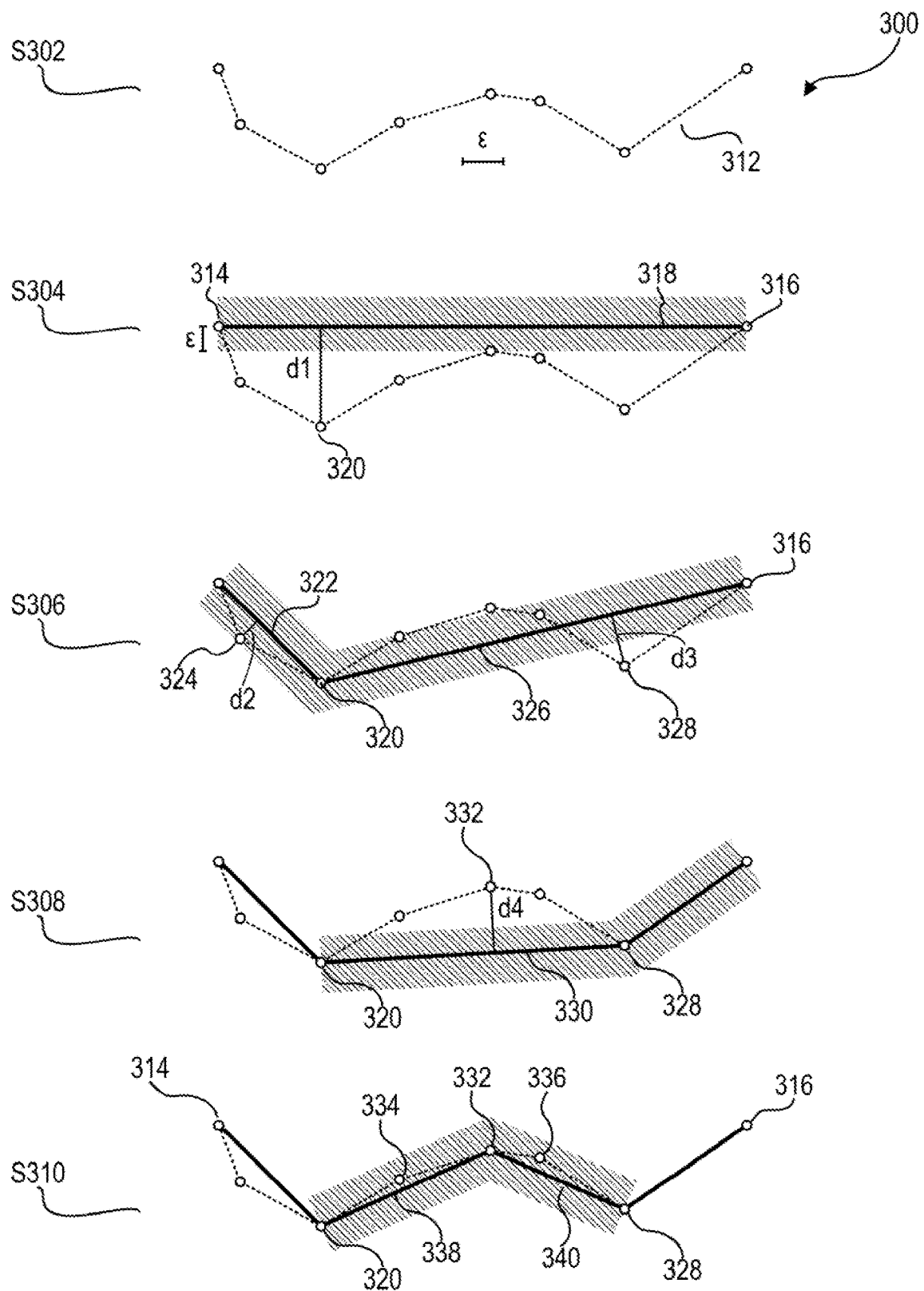
FIG. 3 is a schematic illustration of an exemplary curve simplification process in accordance with some embodiments.

The Ramer-Douglas-Peucker algorithm, also known as a Douglas-Peucker algorithm or an iterative end-point fit algorithm, is an algorithm that can decimate a curve with line segments to a similar curve with fewer points. An exemplary simplification process (300) based on the Ramer-Douglas-Peucker algorithm can be shown in FIG. 3. As shown in FIG. 3, at step (302), a curve (312) can be provided. The curve (312) can include a plurality of line segments (or 2D isolines) that are formed based on a plurality of points (e.g., the interpolated points in FIG. 2). At step (304), a first point (314) and a last point (316) of the curve (312) can be connected to form a reference line (318). A point (320) of the curve (312) that has a largest distance d1 to the reference line (318) can be identified. If the d1 is larger than the constant ϵ, the point (320) can be kept. Then the process (300) can proceed to step (S306). A reference line (322) can be formed to connect the first point (314) and the point (320). A point (324) that has a largest distance d2 to the reference line (322) can be identified. If the d2 is smaller than the constant ϵ, the point (324) can be skipped. Further, a reference line (326) can be identified by connecting the point (320) and the last point (316). A point (328) of the curve (312) can be identified that has a largest distance d3 to the reference line (326). If d3 is larger than the constant E, the point (328) can be kept. The process (300) can proceed to step (308). At step (308), a reference line (330) can be formed by connecting the points (320) and (328). A point (332) can be identified to have a largest distance d4 to the reference line (330). If the d4 is larger than the constant E, the point (332) can be kept. At step (S310), points (334) and (336) can be skipped because a distance between the point (334) and a reference line (or line segment) (338) and a distance between the point (336) and a reference line (or line segment) (340) are less than the constant €. Finally, points (314), (316), (320), (328), and (332) can be kept. Based on the remaining points, which are the points (314), (316), (320), (328), and (332), a plurality of simplified line segment loops that include line segments, such as line segments (338) and (340), can be formed. Accordingly, the curve (312) can be simplified by the plurality of simplified line segments.

At step (S112), Poisson sampling (e.g., Poisson disk sampling) can be performed on an interior of the simplified line segment loops (124). In an example, an oversampling can be performed to determine a plurality of samples in the domain of the simplified line segment loops (124) and the remaining points $P_{line}$ can be kept as selected samples. Further, the plurality of samples generated by the Poisson sampling can be eliminated (or reduced) using an elimination algorithm, such as a weighted sample elimination. After sample elimination, a sample set can be formed and denoted as $S_{Poisson}$ (126). The sample set $S_{Poisson}$ (216) can follow a uniform distribution and contains $P_{line}$.

Poisson disk sampling can produce points that are tightly-packed, but no closer to each other than a specified minimum distance, resulting in a more natural pattern. In an example, the closeness can be defined by a Poisson disk radius, which can be a half distance between two closest samples. As compared to regular random sampling, a Poisson disk sample set can provide a much more uniform sample distribution over a sampling domain. Beyond providing a nice distribution of sample points, the Poisson disk sample set can also provide superior convergence properties with a random Monte Carlo sampling. A same number of Poisson disk samples can produce a lower noise, as compared to a random sampling.

Weighted sample elimination can be an algorithm for picking a subset with a reasonably large Poisson disk radius from a given set of input samples. Based on the weighted sample elimination, a weight can be assigned to each sample based on distances of the respective sample to neighbors of the respective sample. At each step, a sample with a highest weight can be eliminated and weights of remaining samples around the respective sample can be adjusted. Therefore, an efficient implementation of this algorithm may need two relatively common data structures: a spatial partitioning structure for quickly finding neighboring samples and a priority queue for picking a sample with the highest weight. In an exemplary implementation of the weighted sample elimination, a k-d tree (or k-dimensional tree) and a heap can be applied respectively, resulting in an algorithm shown in Table 1. The k-d tree can be configured to find neighboring samples of a current sample. The heap can be configured to select a neighboring sample of the current sample that corresponds to a largest weight in the heap.

TABLE 1

A pseudo code of weighted sample elimination

```
function WeightedSampleElim (samples)
    Build a k-d tree for samples
    Assign weights h_i to each sample s_i
    Build a heap for s_i using weights h_i
    While number of samples > desired
        s_j ← pull the top sample from heap
        for each sample s_i around s_j
            remove h_ij from h_i
            update the heap position of s_i
```

In an example of Table 1, each of the plurality of samples (e.g., $s_i$) can be assigned with a weight $h_i$ of the respective sample. A first sample (e.g., $s_1$) of the plurality of samples and neighboring samples of the first sample can be determined based on a k-dimensional tree structure of the plurality of samples. A heap can be built based on the first sample and the neighboring samples of the first sample. The heap can indicate that the first sample and the neighboring samples of the first sample are organized in a binary tree-based structure based on the weighs of the first sample and the neighboring samples of the first sample. One of the neighboring samples (e.g., $s_j$) of the first sample that corresponds to a largest weight in the heap can be removed. The weight (e.g., $h_1$) of the first sample can be updated by remove the $h_{i,1}$.

In the weighted sample elimination, a weight $h_i$ of a sample i can be determined as a sum of all $h_{ij}$. $h_{ij}$ can indicate weight contribution of a neighboring sample j on the sample i, for all samples j (i≠j) that are within a 2 $r_{max}$ distance of the sample i. The weight function $h_{ij}$ can go to 1 when a distance between the two samples $d_{ij}$ goes to zero and can drop to zero as $d_{ij}$ increases up to 2 $r_{max}$. An exemplary weight function $h_{ij}$ can be defined in equation (1) as follows:

$$h_{ij} = \left(1 - \frac{\hat{d}_{ij}}{2r_{max}}\right)^\alpha \quad \text{Eq. (1)}$$

with $\hat{d}_{ij}$=min ($d_{i,j}$, 2 $r_{max}$). α can be a constant. In an example, α=8. In an example, a value $r_{max}$ can depend on a sampling domain and defined in equation (2) as follows:

$$r_{max,2} = \sqrt{\frac{A_2}{2\sqrt{3}N}} \quad \text{Eq. (2)}$$

where $A_2$ is an area of the sampling domain, such as a domain of the plurality of simplified line segment loops (124). N can be a total count of the samples on the domain of the simplified line segment loops (124) based on the Poisson sampling.

The k-d tree can be a binary tree in which each node is a k-dimensional point. k can be 2, 3, or the like. Each non-leaf node can be considered as implicitly generating a splitting hyperplane that divides a space of the k-d tree into two parts, known as half-spaces. Points to a left of the hyperplane can be represented by a left subtree of the non-leaf node and points to a right of the hyperplane can be represented by a right subtree. The hyperplane direction can be chosen in a way as follows: every node in the tree can be associated with one of the k dimensions, with the hyperplane perpendicular to an axis of the one of the k dimensions. So, for example, if for a particular split a "x" axis is chosen, all points in the subtree with a smaller "x" value than the node will appear in the left subtree and all points with a larger "x" value will be in the right subtree. In such a case, the hyperplane can be set by the x value of the point.

A Heap can be a special tree-based data structure in which the tree can be a complete binary tree. Heaps can include two types: a max-heap and a min-heap. In a max-heap, a current sample present at a root node may be greatest among samples present as children samples of the current sample. The same property may be recursively true for all sub-trees in the max-heap. In a Min-Heap, a current sample present at a root node may be minimum among samples present as children samples of the current sample. The same property may be recursively true for all sub-trees in the min-heap.

At step (S114), constrained Delaunay triangulation of $S_{Poisson}$ (126) can be applied to output $M_{proxy}$ (128). Each sample in the sample set $S_{Poisson}$ (126) can be considered as a respective proxy vertex of the $M_{proxy}$ (128). As shown in FIG. 1, a plurality of Delaunay triangles can be formed based on $S_{Poisson}$ (126). A circumstance of each Delaunay triangle can have an empty circle.

Thus, as shown in FIG. 1, the pipeline (100) can be independent of complexity of the input model (e.g., the input visual mesh (116)). The pipeline (100) can be able to bridge disconnected components. Further, an output of the pipeline (100), such as the proxy mesh (128), can be single-side surfaces.

Linear blend skinning is commonly used in game engines for direct skeletal shape deformation. In an example, a set of visual vertices $V_{visual}$ of a visual mesh (e.g., visual mesh (116) can include a plurality of visual vertices $v_1, v_2, \cdots$, and $v_n$, which can be denoted as $v_1, v_2, \cdots$, and $v_n \in V_{visual}$. Note that $v_i$ can be $R^4$ vectors with a last coordinate equal to one, according to common convention of homogeneous coordinates. A proxy mesh (e.g., proxy mesh (128)) that corresponds to the visual mesh (e.g., visual mesh (116)) can be determined, such as based on the pipeline (100). The proxy mesh can include a plurality of proxy vertices, such as the set of proxy vertices (126). Each proxy vertex can indicate a bone of a skeleton of a character model and can be associated with a spatial transformation matrix $T_j$. The spatial transformation matrix $T_j$ can include a translation matrix and/or a rotation matrix. The spatial transformation matrix $T_j$ can be updated based on a proxy mesh simulation result of each frame. A position $v_i$ of a visual vertex $v_i$ can be updated as $v'_i$ based on neighboring N proxy vertices of the proxy mesh in equation (3):

$$v'_i = \left(\sum_{j=1}^N w_{i,j}T_j\right)v_i \quad \text{Eq. (4)}$$

where $w_{i,j}$ can be a vertex weight (or skinning weight) describing amount of influence of a bone (or proxy vertex) j on the visual vertex $v_i$. N can be a positive integer. In an example, four proxy vertices can impact each visual vertex at maximum. Thus N=4. In an example, $w_{ij}>0$ and $\Sigma_{j=1}^4 w_{i,j}=1$ (e.g., partition of unity). Thus, based on equation (4), when positions of neighboring bones (or proxy vertices) are changed, a position of a visual vertex can be updated accordingly. Equation (4) describes how movement of a visual mesh follows movement of a proxy mesh.

To compute a vertex weight for a smooth and realistic deformation, a vertex weighting function can be provided in equation (5) based on distances between a visual vertex and N neighboring proxy vertices of the visual vertex. In an example, when N=4, for each visual vertex, distances between the respective visual vertex and four closest proxy vertices of the respective visual vertex can be denoted as $d_1$, $d_2$, $d_3$, and $d_4$. Thus, a skinning weight (or vertex weight) $w_{i,j}$ associated with each proxy vertex can be shown in equation (5) as follows:

$$w_{i,j} = \begin{cases} 1, & \text{if } d_j/d_{max} < \epsilon_d, \\ e^{-\sigma^2\left(\frac{d_j/d_{max}}{1-\epsilon_d}\right)^2}, & \text{otherwise,} \end{cases} \quad \text{Eq. (5)}$$

where $d_j$ can indicate one of $d_1$, $d_2$, $d_3$, and $d_4$. $d_{max}$=max ($d_1$, $d_2$, $d_3$, $d_4$). $\epsilon_d$ can be a constant. In an example, $\epsilon_d$ can be equal to or less than 0.2. Further, a normalization can be performed to make $\Sigma_{j=1}^{4} w_{i,j}=1$.

Figure 4:
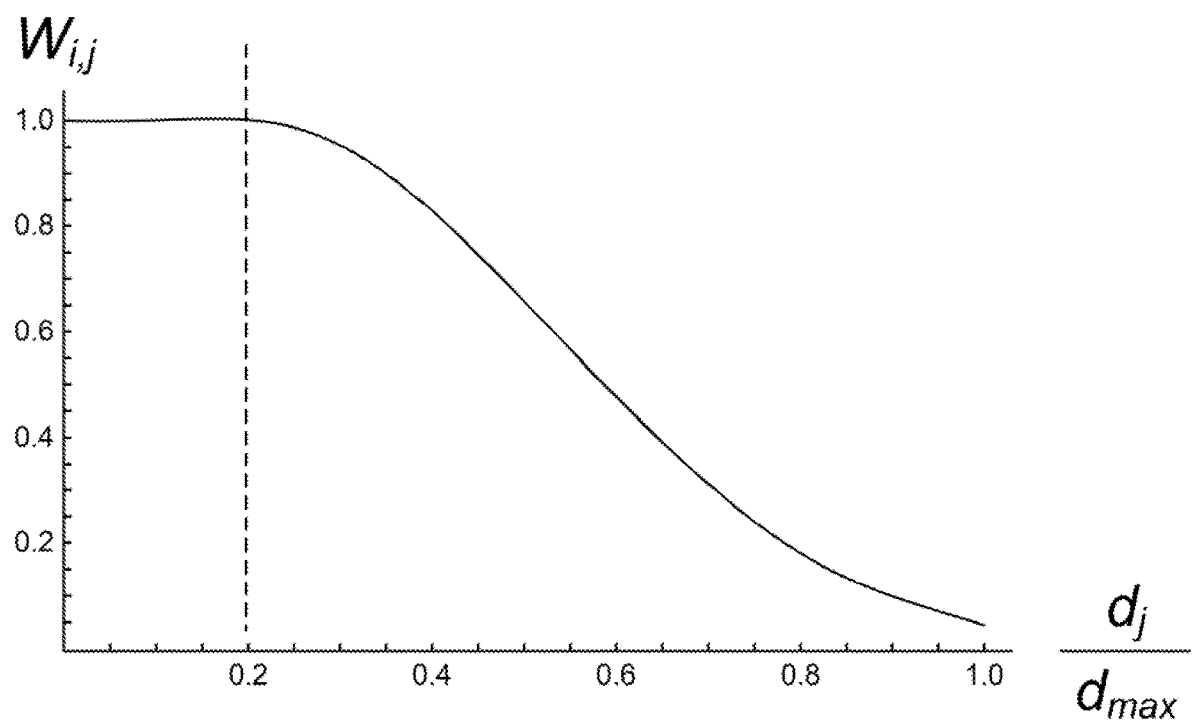
FIG. 4 shows an exemplary distance-based vertex weight function in accordance with some embodiments.

FIG. 4 shows an exemplary relationship between $w_{i,j}$ and $d_j/d_{max}$ when $\epsilon_d$=0.2 based on equation (5). As shown in FIG. 4, when $d_j/d_{max}$ is less than 0.2, $w_{i,j}$ can be defined as 1. When $d_j/d_{max}$ is larger than 0.2, $w_{i,j}$ decreases as $d_j/d_{max}$ increases.

Figure 5A:
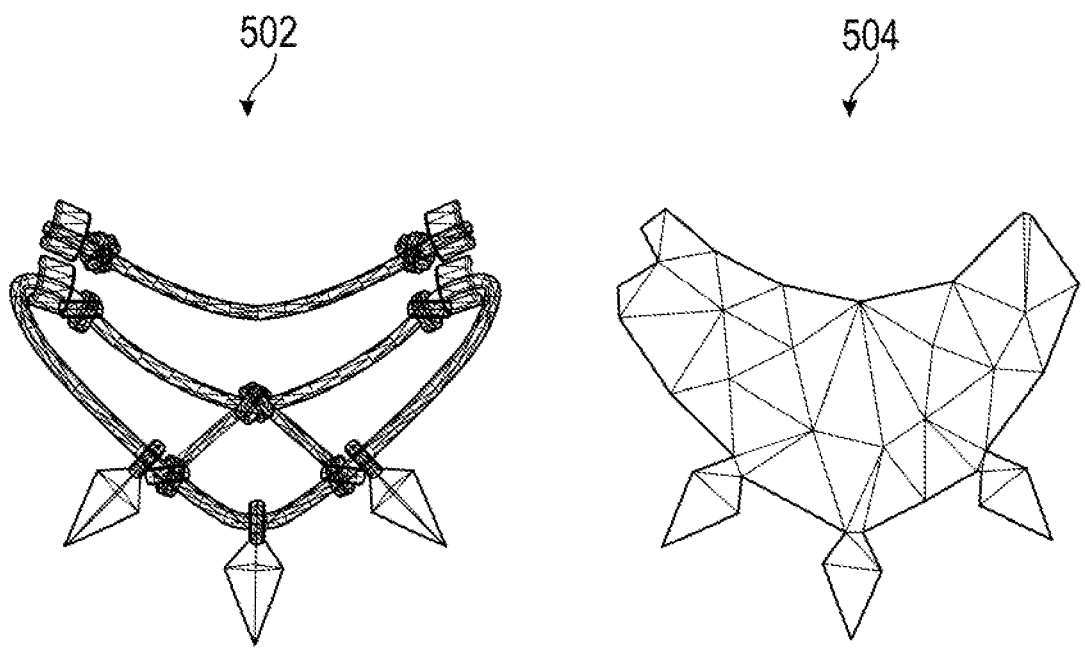
FIGS. 5A, 5B, 5C, 5D, and 5E show exemplary simulated proxy meshes and visual meshes corresponding to the simulated meshes in accordance with some embodiments.
Figure 5B:
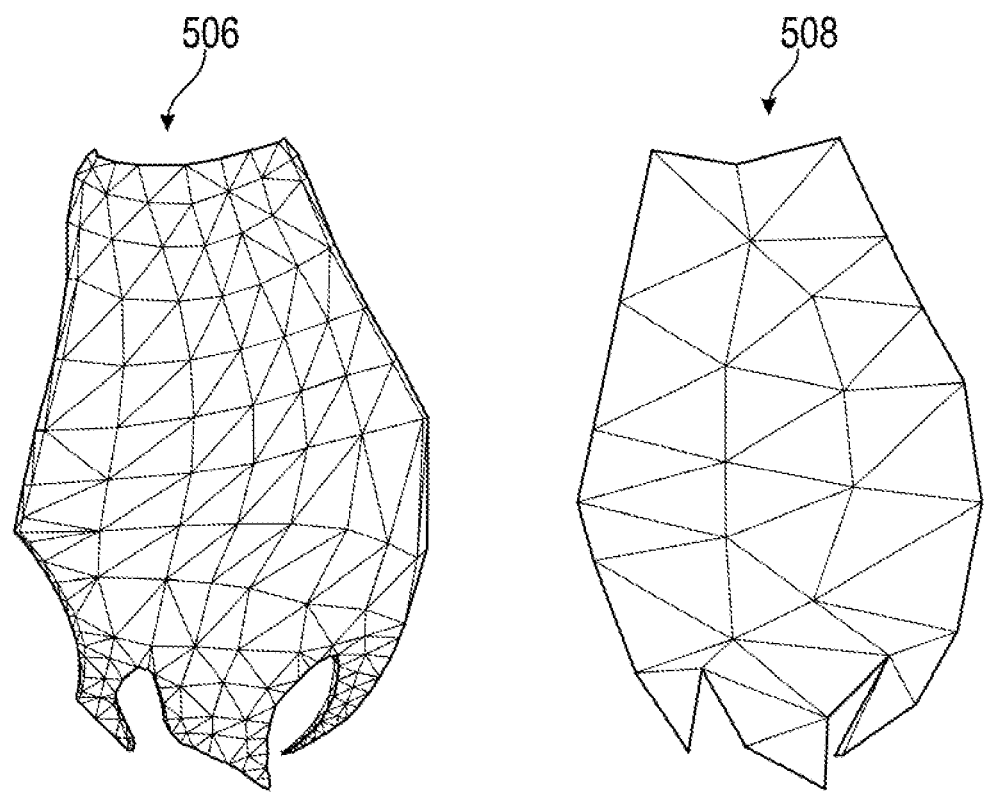
Figure 5C:
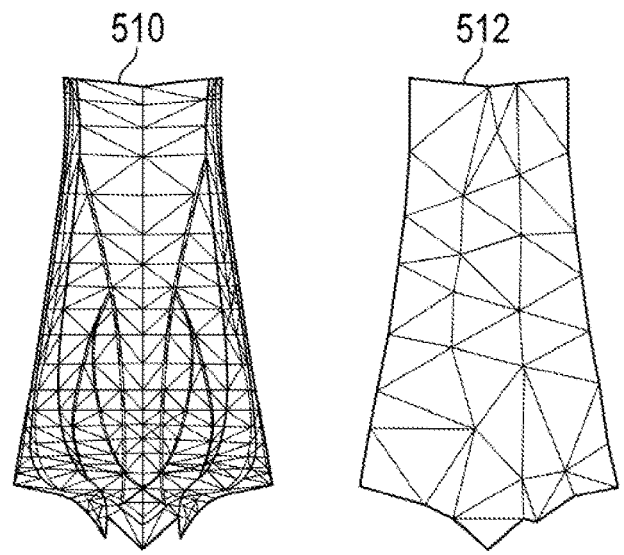
Figure 5D:
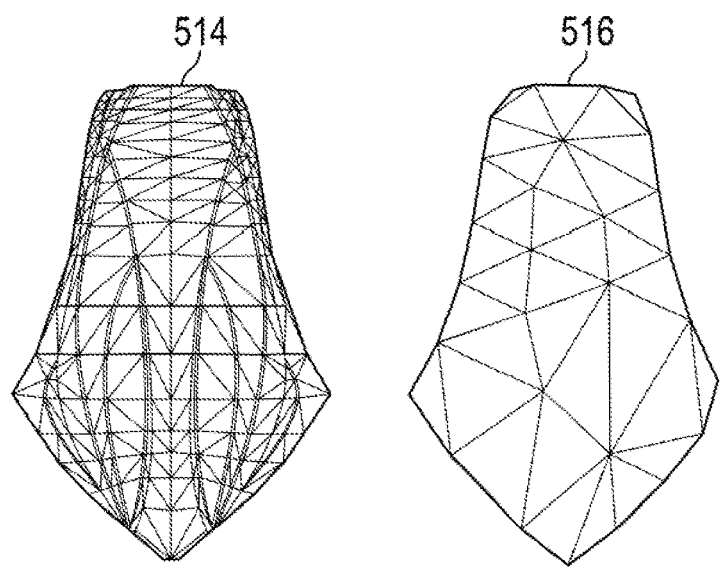
Figure 5E:
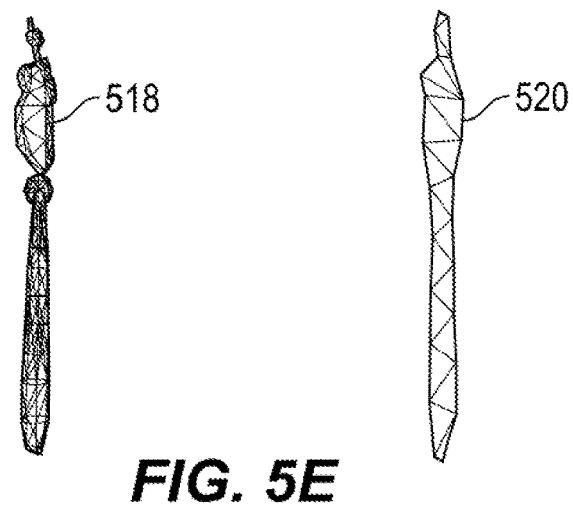

Test data of proxy mesh generation based on the method described in FIG. 1 and equation (4) can be shown in FIGS. 5A-5E. FIG. 5A shows a first visual mesh (502) and a first proxy mesh (504) generated based on the first visual mesh (502). FIG. 5B shows a second visual mesh (506) and a second proxy mesh (508) generated based on the second visual mesh (506). FIG. 5C shows a third visual mesh (510) and a third proxy mesh (512) generated based on the third visual mesh (510). FIG. 5D shows a fourth visual mesh (514) and a fourth proxy mesh (516) generated based on the fourth visual mesh (514). FIG. 5E shows a fifth visual mesh (518) and a fifth proxy mesh (520) generated based on the fifth visual mesh (518). As shown in FIGS. 5A-5E, the method of the disclosure can robustly convert an input visual mesh (with holes, multi-layer, and disconnected components) to a proxy mesh with a small number of vertices.

Figure 6:
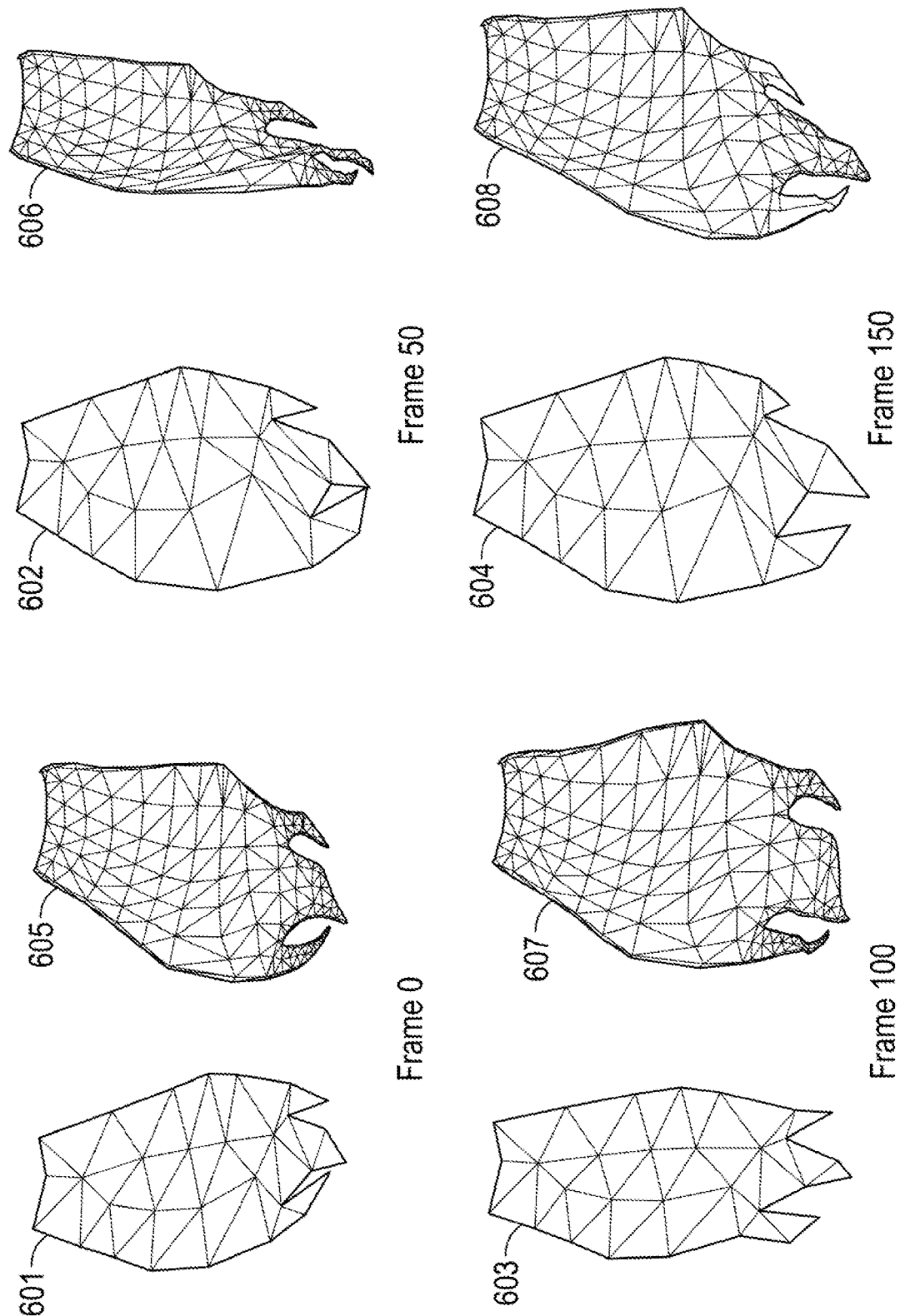
FIG. 6 shows an exemplary sequence of simulated proxy meshes and visual meshes corresponding to the simulated proxy meshes.

The distance-based vertex weighting function (e.g., equation (5)) can further be evaluated on a cape model in which the cape can be illustrated by a visual mesh. FIG. 6 shows a sequence of simulated proxy meshes (601)-(604) at different frames of a video and a sequence of visual meshes (605)-(608) that corresponds to and is driven by the proxy meshes (601)-(604). As shown in FIG. 6, movement of the visual meshes can follow movement of the simulated proxy meshes closely.

The disclosure provides an automated pipeline designed for generation of proxy meshes tailored for gaming models, such as planar-like cloth models. The disclosed pipeline can output a low-poly proxy mesh that closely conforms to an input visual mesh, along with vertex skinning weights optimized for achieving smooth and realistic skinning deformation. Various cloth models commonly found in gaming scenarios were tested. The test data validates and showcases an efficacy of the disclosed automated pipeline.

Figure 7:
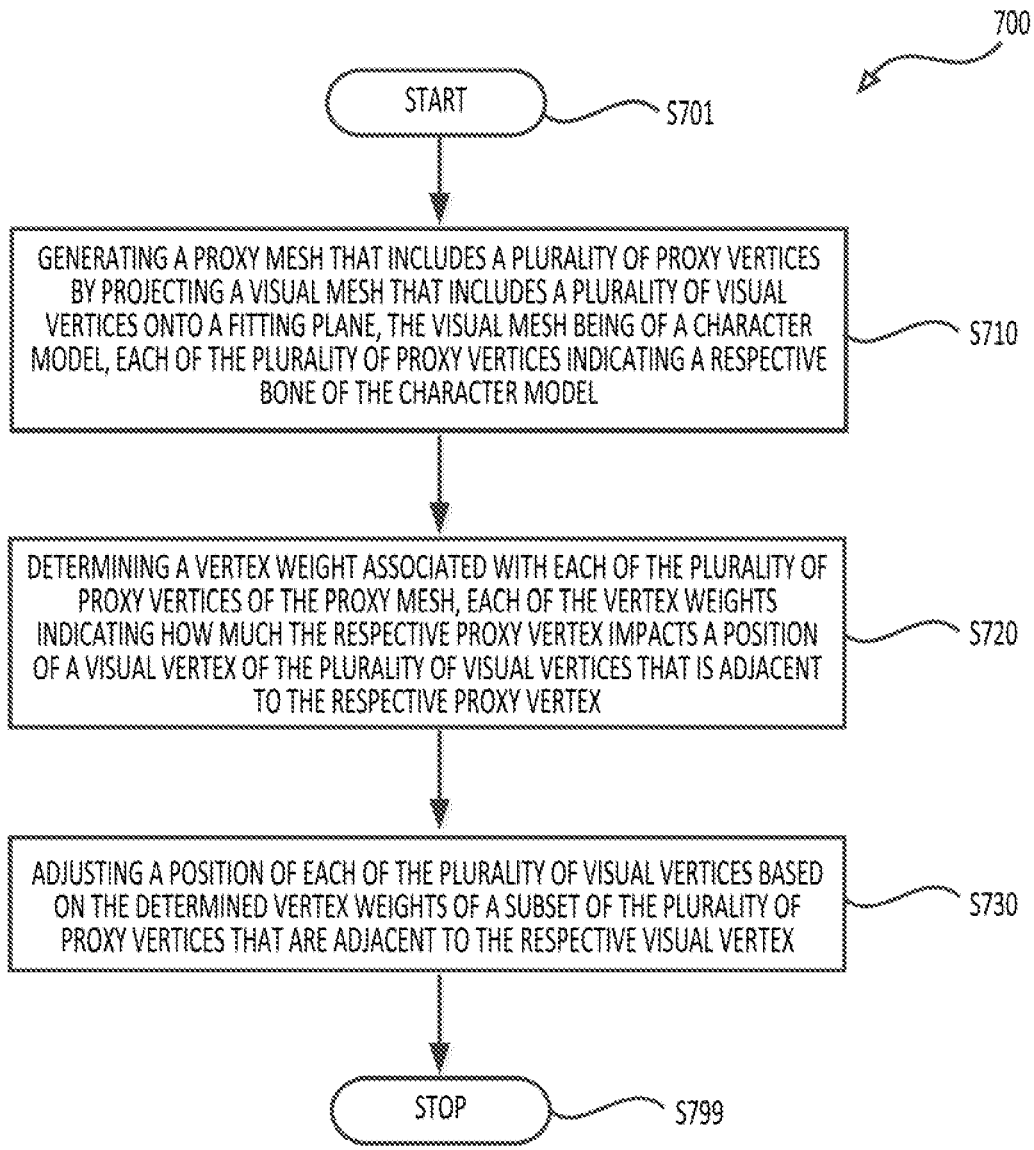
FIG. 7 is a flow chart outlining an exemplary process for proxy mesh generation according to some embodiments of the disclosure.

FIG. 7 shows a flow chart outlining a process (700) for proxy mesh generation according to an embodiment of the disclosure. The process starts at (S701) and proceeds to (S710).

At (S710), a proxy mesh that includes a plurality of proxy vertices is generated by projecting a visual mesh that includes a plurality of visual vertices onto a fitting plane. The visual mesh may be of a character model. Each of the plurality of proxy vertices indicates a respective bone of the character model. An exemplary embodiment of (S710) can be shown in FIG. 1.

At (S720), a vertex weight associated with each of the plurality of proxy vertices of the proxy mesh is determined. Each of the vertex weights indicates how much the respective proxy vertex impacts a position of a visual vertex of the plurality of visual vertices that is adjacent to the respective proxy vertex. An exemplary embodiment of (S720) can be shown in equation (5).

At (S730), a position of each of the plurality of visual vertices is adjusted based on the determined vertex weights of a subset of the plurality of proxy vertices that are adjacent to the respective visual vertex. An exemplary embodiment of (S730) can be shown in equation (4).

In an example, a first principal component of the plurality of visual vertices is determined based on a principal component analysis (PCA). The first principal component includes the most variation of the plurality of visual vertices. The fitting plane is determined based on the first principal component in which a normal vector of the fitting plane is determined based on a direction of the first principal component.

In an example, samples are obtained from each of a plurality of faces of the visual mesh based on a uniform sampling. Each of the plurality of faces of the visual mesh is defined by a respective subset of the plurality of visual vertices. The obtained samples from the plurality of faces of the visual mesh are projected onto the fitting plane. A two-dimensional (2D) signed distance field is determined on the fitting plane on which the obtained samples are projected.

In an example, a plurality of 2D isolines is extracted from the 2D signed distance field based on an iso-value through Marching Squares. An outer boundary of the 2D signed distance field is defined by the plurality of 2D isolines.

In an example, a plurality of 2D squares is determined in the 2D signed distance field based on samples in the 2D signed distance field. Each of the plurality of 2D squares includes 4 respective samples. States of the samples of each of the plurality of 2D squares are determined based on the iso-value. The states of the samples of the respective one of the plurality of 2D squares indicate whether the samples are larger than the iso-value. A point is determined between each pair of adjacent samples of the plurality of 2D squares that have different states. Adjacent points of the determined points are connected to form the plurality of 2D isolines.

In an example, a plurality of simplified line segment loops is generated based on the plurality of 2D isolines. The plurality of simplified line segment loops is generated based on a subset of the determined points, where a distance between the plurality of simplified line segment loops and the plurality of 2D isolines is equal to or less than a threshold value.

In an example, a Poisson disk sample set is generated. The Poisson disk sample includes a plurality of samples within a domain defined by the plurality of simplified line segment loops in which a distance between each pair of neighboring samples of the Poisson disk sample set is larger than a threshold distance. A subset of the plurality of samples is removed to generate the plurality of proxy vertices. The subset of the plurality of samples is removed based on a weighted sample elimination in which each of the plurality of samples is assigned with a weight and the subset of the plurality of samples are removed according to the respective weights.

In an example, each of the plurality of samples is assigned with the respective weight. A first sample of the plurality of samples and neighboring samples of the first sample are determined based on a k-dimensional tree structure of the plurality of samples. A heap is built based on the first sample of the plurality of samples and the neighboring samples of the first sample. The heap indicates that the first sample and the neighboring samples of the first sample are organized in a binary tree-based structure based on the weights of the first sample and the neighboring samples of the first sample. One of the neighboring samples of the first sample is removed that corresponds to a largest weight in the heap.

In an example, the weight of each sample of the plurality of samples is associated with distances between the respective sample and respective neighboring samples of the respective sample.

In an example, the proxy mesh is generated based on a plurality of Delaunay triangles that are formed based on the plurality of proxy vertices, where a circumcircle of each of the plurality of Delaunay triangles being an empty circle.

In an example, the position of a i-th visual vertex of the plurality of visual vertices is adjusted based on four proxy vertices of the plurality of proxy vertices adjacent to the i-th visual vertex according to $v'_i=(\Sigma_{j=1}^{4} w_{i,j}T_j)v_i$. $v_i$ is an initial position of the i-th visual vertex. $v'_i$ is the adjusted position of the i-th visual vertex. $T_j$ is a spatial transformation matrix associated with a j-th proxy vertex of the four proxy vertices. $w_{i,j}$ is the vertex weight that is associated with the j-th proxy vertex and indicates how much the j-th proxy vertex impacts the initial position of the i-th visual vertex.

In an example, the vertex weight $w_{i,j}$ associated with the j-th proxy vertex is determined as:

$$w_{i,j} = \begin{cases} 1, & \text{if } d_j/d_{max} < \epsilon_d, \\ e^{-\sigma^2\left(\frac{d_j/d_{max}}{1-\epsilon_d}\right)^2}, & \text{otherwise.} \end{cases}$$

$d_j$ indicates a distance between the j-th proxy vertex and the i-th visual vertex. $d_{max}=\max(d_1, d_2, d_3, d_4)$. $\epsilon_d$ is a pre-defined value.

Then, the process proceeds to (S799) and terminates.

The process (700) can be suitably adapted. Step(s) in the process (700) can be modified and/or omitted. Additional step(s) can be added. Any suitable order of implementation can be used.

The techniques described above, can be implemented as computer software using computer-readable instructions and physically stored in one or more computer-readable media. For example, FIG. 8 shows a computer system (800) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 8:
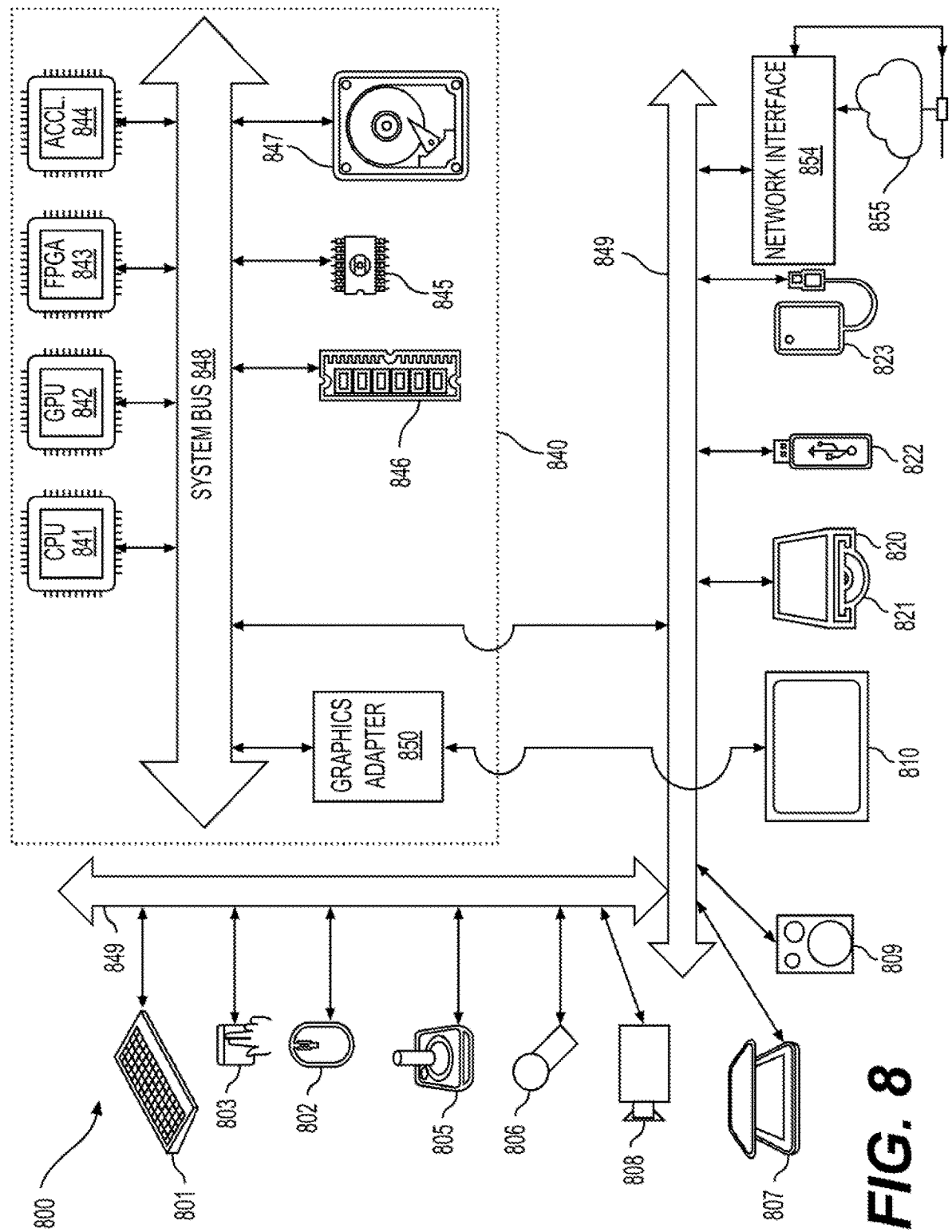
FIG. 8 is a schematic illustration of a computer system in accordance with an embodiment.

The components shown in FIG. 8 for computer system (800) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (800).

Computer system (800) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (801), mouse (802), trackpad (803), touch screen (810), data-glove (not shown), joystick (805), microphone (806), scanner (807), camera (808).

Computer system (800) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (810), data-glove (not shown), or joystick (805), but there can also be tactile feedback devices that do not serve as input devices), audio output devices (such as: speakers (809), headphones (not depicted)), visual output devices (such as screens (810) to include CRT screens, LCD screens, plasma screens, OLED screens, each with or without touch-screen input capability, each with or without tactile feedback capability-some of which may be capable to output two dimensional visual output or more than three dimensional output through means such as stereographic output; virtual-reality glasses (not depicted), holographic displays and smoke tanks (not depicted)), and printers (not depicted).

Computer system (800) can also include human accessible storage devices and their associated media such as optical media including CD/DVD ROM/RW (820) with CD/DVD or the like media (821), thumb-drive (822), removable hard drive or solid state drive (823), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (800) can also include an interface (854) to one or more communication networks (855). Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (849) (such as, for example USB ports of the computer system (800)); others are commonly integrated into the core of the computer system (800) by attachment to a system bus as described below (for example Ethernet interface into a PC computer system or cellular network interface into a smartphone computer system). Using any of these networks, computer system (800) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (840) of the computer system (800).

The core (840) can include one or more Central Processing Units (CPU) (841), Graphics Processing Units (GPU) (842), specialized programmable processing units in the form of Field Programmable Gate Areas (FPGA) (843), hardware accelerators for certain tasks (844), graphics adapters (850), and so forth. These devices, along with Read-only memory (ROM) (845), Random-access memory (846), internal mass storage such as internal non-user accessible hard drives, SSDs, and the like (847), may be connected through a system bus (848). In some computer systems, the system bus (848) can be accessible in the form of one or more physical plugs to enable extensions by additional CPUs, GPU, and the like. The peripheral devices can be attached either directly to the core's system bus (848), or through a peripheral bus (849). In an example, the screen (810) can be connected to the graphics adapter (850). Architectures for a peripheral bus include PCI, USB, and the like.

CPUs (841), GPUs (842), FPGAs (843), and accelerators (844) can execute certain instructions that, in combination, can make up the aforementioned computer code. That computer code can be stored in ROM (845) or RAM (846). Transitional data can also be stored in RAM (846), whereas permanent data can be stored for example, in the internal mass storage (847). Fast storage and retrieve to any of the memory devices can be enabled through the use of cache memory, that can be closely associated with one or more CPU (841), GPU (842), mass storage (847), ROM (845), RAM (846), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (800), and specifically the core (840) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (840) that are of non-transitory nature, such as core-internal mass storage (847) or ROM (845). The software implementing various embodiments of the present disclosure can be stored in such devices and executed by core (840). A computer-readable medium can include one or more memory devices or chips, according to particular needs. The software can cause the core (840) and specifically the processors therein (including CPU, GPU, FPGA, and the like) to execute particular processes or particular parts of particular processes described herein, including defining data structures stored in RAM (846) and modifying such data structures according to the processes defined by the software. In addition or as an alternative, the computer system can provide functionality as a result of logic hardwired or otherwise embodied in a circuit (for example: accelerator (844)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

The use of "at least one of" or "one of" in the disclosure is intended to include any one or a combination of the recited elements. For example, references to at least one of A, B, or C; at least one of A, B, and C; at least one of A, B, and/or C; and at least one of A to C are intended to include only A, only B, only C or any combination thereof. References to one of A or B and one of A and B are intended to include A or B or (A and B). The use of "one of" does not preclude any combination of the recited elements when applicable, such as when the elements are not mutually exclusive.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method of mesh processing, the method comprising:
generating a proxy mesh that includes a plurality of proxy vertices, the proxy mesh being generated based on a visual mesh by projecting the visual mesh that includes a plurality of visual vertices onto a fitting plane, the visual mesh being of an object worn by a character model, each of the plurality of proxy vertices indicating a respective bone of the character model and neighboring one or more of the plurality of visual vertices of the visual mesh;
determining a vertex weight associated with each of the plurality of proxy vertices of the proxy mesh, each of the vertex weights indicating how much the respective proxy vertex impacts a position of one of the one or more of the plurality of visual vertices that is adjacent to the respective proxy vertex; and
adjusting a position of each of the plurality of visual vertices based on the determined vertex weights of a subset of the plurality of proxy vertices that are adjacent to the respective visual vertex.

2. The method of claim 1, wherein the generating the proxy mesh further comprises:
determining a first principal component of the plurality of visual vertices based on a principal component analysis (PCA), the first principal component including a most variation of the plurality of visual vertices; and determining the fitting plane based on the first principal component in which a normal vector of the fitting plane is determined based on a direction of the first principal component.

3. The method of claim 2, wherein the generating the proxy mesh further comprises:
obtaining samples from each of a plurality of faces of the visual mesh based on a uniform sampling, each of the plurality of faces of the visual mesh being defined by a respective subset of the plurality of visual vertices;
projecting the obtained samples from the plurality of faces of the visual mesh onto the fitting plane; and
determining a two-dimensional (2D) signed distance field on the fitting plane on which the obtained samples are projected.

4. The method of claim 3, wherein the generating the proxy mesh further comprises:
extracting a plurality of 2D isolines from the 2D signed distance field based on an iso-value through Marching Squares, an outer boundary of the 2D signed distance field being defined by the plurality of 2D isolines.

5. The method of claim 4, wherein the extracting the plurality of 2D isolines further comprises:
determining a plurality of 2D squares in the 2D signed distance field based on samples in the 2D signed distance field, each of the plurality of 2D squares including 4 respective samples;
classifying states of the samples of each of the plurality of 2D squares based on the iso-value, the states of the samples of the respective one of the plurality of 2D squares indicating whether the samples are larger than the iso-value;
determining a point between each pair of adjacent samples of the plurality of 2D squares that have different states; and
connecting adjacent points of the determined points to form the plurality of 2D isolines.

6. The method of claim 5, wherein the generating the proxy mesh further comprises:
generating a plurality of simplified line segment loops based on the plurality of 2D isolines, the plurality of simplified line segment loops being generated based on a subset of the determined points, a distance between the plurality of simplified line segment loops and the plurality of 2D isolines being equal to or less than a threshold value.

7. The method of claim 6, wherein the generating the proxy mesh further comprises:
generating a Poisson disk sample set that includes a plurality of samples within a domain defined by the plurality of simplified line segment loops in which a distance between each pair of neighboring samples of the Poisson disk sample set is larger than a threshold distance; and
removing a subset of the plurality of samples to generate the plurality of proxy vertices, the subset of the plurality of samples being removed based on a weighted sample elimination in which each of the plurality of samples is assigned with a weight and the subset of the plurality of samples are removed according to the respective weights.

8. The method of claim 7, wherein the removing further comprises:
assigning each of the plurality of samples with the respective weight;
determining a first sample of the plurality of samples and neighboring samples of the first sample based on a k-dimensional tree structure of the plurality of samples;
building a heap based on the first sample of the plurality of samples and the neighboring samples of the first sample, the heap indicating that the first sample and the neighboring samples of the first sample are organized in a binary tree-based structure based on the weights of the first sample and the neighboring samples of the first sample; and
removing one of the neighboring samples of the first sample that corresponds to a largest weight in the heap.

9. The method of claim 7, wherein the weight of each sample of the plurality of samples is associated with distances between the respective sample and respective neighboring samples of the respective sample.

10. The method of claim 1, wherein the generating the proxy mesh further comprises:
generating the proxy mesh based on a plurality of Delaunay triangles that are formed based on the plurality of proxy vertices, a circumcircle of each of the plurality of Delaunay triangles being an empty circle.

11. The method of claim 1, wherein the adjusting the position of each of the plurality of visual vertices further comprises:
adjusting the position of a i-th visual vertex of the plurality of visual vertices based on four proxy vertices of the plurality of proxy vertices adjacent to the i-th visual vertex according to $v'_i = (\Sigma_{j=1}^{4} w_{i,j} T_j) v_i$, $v_i$ being an initial position of the i-th visual vertex, $v'_i$ being the adjusted position of the i-th visual vertex, $T_j$ being a spatial transformation matrix associated with a j-th proxy vertex of the four proxy vertices, $w_{i,j}$ being the vertex weight that is associated with the j-th proxy vertex and indicates how much the j-th proxy vertex impacts the initial position of the i-th visual vertex.

12. The method of claim 11, wherein the determining the vertex weight further comprises:
determining the vertex weight $w_{i,j}$ associated with the j-th proxy vertex as:

$$w_{i,j} = \begin{cases} 1, & \text{if } d_j/d_{max} < \epsilon_d, \\ e^{-\sigma^2 \left(\frac{d_j/d_{max}}{1-\epsilon_d}\right)^2}, & \text{otherwise,} \end{cases}$$

$d_j$ indicating a distance between the j-th proxy vertex and the i-th visual vertex, $d_{max}=\max(d_1, d_2, d_3, d_4)$, $\epsilon_d$ being a predefined value.

13. An apparatus of mesh processing, the apparatus comprising:
processing circuitry configured to:
generate a proxy mesh that includes a plurality of proxy vertices, the proxy mesh being generated based on a visual mesh by projecting the visual mesh that includes a plurality of visual vertices onto a fitting plane, the visual mesh being of an object worn by a character model, each of the plurality of proxy vertices indicating a respective bone of the character model and neighboring one or more of the plurality of visual vertices of the visual mesh;
determine a vertex weight associated with each of the plurality of proxy vertices of the proxy mesh, each of the vertex weights indicating how much the respective proxy vertex impacts a position of one of the one or more of the plurality of visual vertices that is adjacent to the respective proxy vertex; and adjust a position of each of the plurality of visual vertices based on the determined vertex weights of a subset of the plurality of proxy vertices that are adjacent to the respective visual vertex.

14. The apparatus of claim 13, wherein the processing circuitry is configured to:

determine a first principal component of the plurality of visual vertices based on a principal component analysis (PCA), the first principal component including a most variation of the plurality of visual vertices; and determine the fitting plane based on the first principal component in which a normal vector of the fitting plane is determined based on a direction of the first principal component.

15. The apparatus of claim 14, wherein the processing circuitry is configured to:

obtain samples from each of a plurality of faces of the visual mesh based on a uniform sampling, each of the plurality of faces of the visual mesh being defined by a respective subset of the plurality of visual vertices;

project the obtained samples from the plurality of faces of the visual mesh onto the fitting plane; and determine a two-dimensional (2D) signed distance field on the fitting plane on which the obtained samples are projected.

16. The apparatus of claim 15, wherein the processing circuitry is configured to:

extract a plurality of 2D isolines from the 2D signed distance field based on an iso-value through Marching Squares, an outer boundary of the 2D signed distance field being defined by the plurality of 2D isolines.

17. The apparatus of claim 16, wherein the processing circuitry is configured to:

determine a plurality of 2D squares in the 2D signed distance field based on samples in the 2D signed distance field, each of the plurality of 2D squares including 4 respective samples;

classify states of the samples of each of the plurality of 2D squares based on the iso-value, the states of the samples of the respective one of the plurality of 2D squares indicating whether the samples are larger than the iso-value;

determine a point between each pair of adjacent samples of the plurality of 2D squares that have different states; and connect adjacent points of the determined points to form the plurality of 2D isolines.

18. The apparatus of claim 17, wherein the processing circuitry is configured to:

generate a plurality of simplified line segment loops based on the plurality of 2D isolines, the plurality of simplified line segment loops being generated based on a subset of the determined points, a distance between the plurality of simplified line segment loops and the plurality of 2D isolines being equal to or less than a threshold value.

19. The apparatus of claim 18, wherein the processing circuitry is configured to:

generate a Poisson disk sample set that includes a plurality of samples within a domain defined by the plurality of simplified line segment loops in which a distance between each pair of neighboring samples of the Poisson disk sample set is larger than a threshold distance; and remove a subset of the plurality of samples to generate the plurality of proxy vertices, the subset of the plurality of samples being removed based on a weighted sample elimination in which each of the plurality of samples is assigned with a weight and the subset of the plurality of samples are removed according to the respective weights.

20. The apparatus of claim 19, wherein the processing circuitry is configured to:

assign each of the plurality of samples with the respective weight;

determine a first sample of the plurality of samples and neighboring samples of the first sample based on a k-dimensional tree structure of the plurality of samples;

build a heap based on the first sample of the plurality of samples and the neighboring samples of the first sample, the heap indicating that the first sample and the neighboring samples of the first sample are organized in a binary tree-based structure based on the weights of the first sample and the neighboring samples of the first sample; and remove one of the neighboring samples of the first sample that corresponds to a largest weight in the heap.

* * * * *